United States Patent [19]

Della Rosa

[11] 3,866,761
[45] Feb. 18, 1975

[54] DEVICE FOR PASSING TUBES THROUGH A HEAT TREATMENT INSTALLATION
[75] Inventor: Robert Della Rosa, Sedan, France
[73] Assignee: Vallourec Usines a Tubes de Lorraine-Escaut et Vallourec Reunies, Paris, France
[22] Filed: Mar. 16, 1973
[21] Appl. No.: 342,221

[30] Foreign Application Priority Data
Mar. 22, 1972 France .............................. 72.10008

[52] U.S. Cl.................................. 214/1 P, 432/121
[51] Int. Cl............................................. C21d 9/14
[58] Field of Search .............. 214/1 P; 432/121, 124

[56] References Cited
UNITED STATES PATENTS
2,550,159  4/1951  Mickelson ....................... 214/1 P X
3,322,291  5/1967  Smith .............................. 214/1 P X Primary Examiner—Albert J. Makay
Assistant Examiner—George F. Abraham
Attorney, Agent, or Firm—Breitenfeld & Levine

[57] ABSTRACT

The invention relates to a device for passing tubes through a heat treatment installation.

The device comprises an input conveyor at one end and an output conveyor at the other end of the installation, a carriage designed to travel on the rollers of the conveyors and formed by two heads arranged at either end of the treatment installation and joined together by a beam, each head being equipped with a cap support mounted on a retractable arm and designed to fit inside an end of the tube.

9 Claims, 3 Drawing Figures

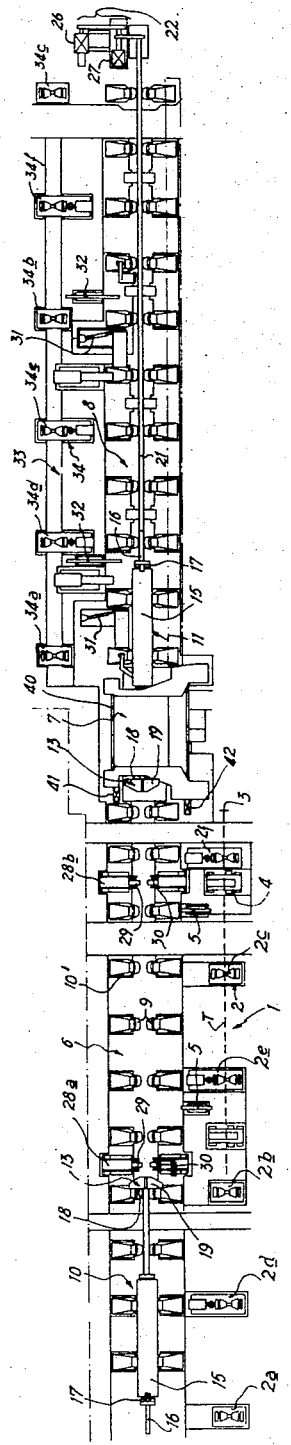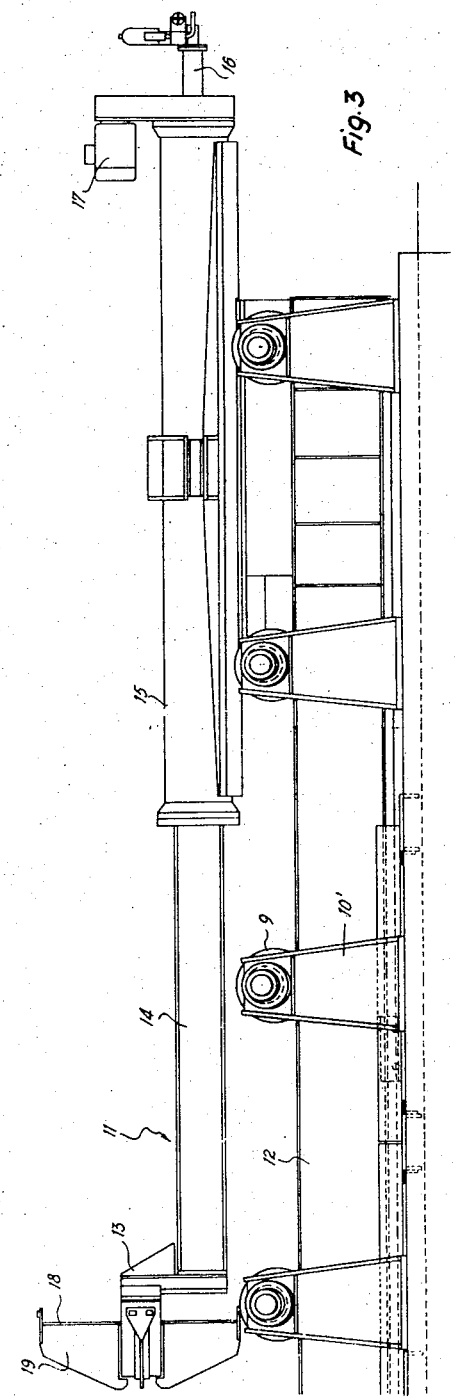

3,866,761

DEVICE FOR PASSING TUBES THROUGH A HEAT TREATMENT INSTALLATION

FIELD OF INVENTION

This invention relates to a device for passing tubes through a heat-treatment installation.

It is particularly useful in the treatment of thin-walled, large-diameter welded metal tubes. Tubes of this kind, made of steel, are used in particular for the piping of liquid or gaseous hydrocarbons. Their walls are generally less than 12.7 mm in thickness, whilst their diameter is generally between 0.5 and 1 m.

In view of the applications envisaged, it is desired to provide tubes of this kind with favourable mechanical properties and, in particular, with a high yield strength. To this end, the various operations carried out on a conventional tube production line are completed by a heat-treatment in which the tubes are heated to an elevated temperature, i.e., to a temperature above 800°C, followed by quenching and, optionally, tempering.

DESCRIPTION OF PRIOR ART

It has already been proposed to carry out this heating process rapidly and effectively over a relatively small length of the moving tube by the induction of low frequency electrical currents so as to avoid the deformation resulting either from the sagging of the tube under the effect of gravity or from the relaxation of the stresses in the tube which, after the forming and welding operations, is subjected to an expanding operation intended to make the tube round whilst, at the same time, adjusting its diameter.

However, the practice of heat-treating thin-walled welded tubes of large diameter shows that it is often difficult to avoid deformation of the tube completely under the combined effect of relaxation of the stresses left after the forming and welding operations, and of the unequal shrinkage due to the weld seam.

According to the present state of the art, the tube is rigidly held in one or more roller cages arranged in front of and behind the heating and quenching installation, whilst the rest of the tube rests on a conveyor. The roller cages are intended on the one hand to ensure that the periphery of the tube remains circular and, on the other hand, to ensure the passage of the tube at the required speed in spite of the considerable, axial magnetic reactions resulting from the presence of the field magnet.

A procedure such as this is attended by the following disadvantages:

- In spite of the rigidity of the system, the ends of the tube are not supported during their passage through the heating zone; this results in initial deformation of the cross section of the tube which is propagated as the treatment progresses and which is reflected in a "roundness defect" left on completion of the treatment.

- Due to the rigidity of the system, the curve which the tube naturally tends to assume during the heating process is inhibited, resulting after treatment in "linearity defect" of the product along a curve contained in the plane defined by the axis of the tube and its weld seam.

These roundness and linearity defects are impossible to reduce in practice by conventional calibrating and straightening means without impairing the quality of the product.

SUMMARY OF INVENTION

The present invention relates to a machine for feeding tubes to the treatment installation and during the treatment process, by which it is possible in particular to avoid roundness and linearity faults in the product.

According to the invention, there is provided a device for passing tubes through a heat-treatment installation comprising an assembly of pairs of rollers forming an input conveyor upstream of the heat-treatment installation and an output conveyor downstream of the installation, a carriage designed to travel on the rollers of the conveyors and formed by two heads which are arranged at either end of the treatment installation and which are joined together by a beam, each head being equipped with a cap mounted on a retractable arm and designed to fit just inside an end of the tube, and positive control means for displacing the carriage on the conveyor rollers in such a way that the caps can be introduced into the two ends of the tube to keep it round throughout the passage of the tube through the treatment installation on the carriage driven by the control means which, in addition, return the carriage to its starting position to receive another tube.

Thus, the carriage delivers the tube through the heat-treatment installation and the caps which it carries effectively support the ends of the tube, thus avoiding any roundness faults whilst, at the same time, containing the axial magnetic reactions.

Preferably, the conveyor rollers are individually adjusted to produce a slight curve in the input and output conveyors in relation to the theoretical axis of the tube to compensate for the bending of the tube under the combined effect of the internal stresses.

The input conveyor may be equipped with motor-driven turning rollers which turn the tube before the cap-carrying heads come into contact with it to position the weld seam in the vertical plane passing through the axis of the tube in the upper position.

Each head of the carriage may comprise a jack actuating the retractable arm carrying the cap, this jack being mounted on a supporting carriage resting on the conveyor rollers on which it can be displaced.

According to one advantageous embodiment, the beam of the carriage carries a nut screwed onto a longitudinal screw-threaded spindle rotated by a control head. It is possible in this way to obtain the positive control designed to displace the carriage resting on the conveyor rollers through jacks.

The head controlling rotation of the screw threaded spindle onto which the nut connected to the carriage is screwed preferably comprises two electrical motors, one of which is a direct-current, i.e., variable-speed, motor which turns the screw in the direction permitting the advance of the carriage guiding the tube through the heattreatment installation, whilst the other electrical motor is an alternating-current motor by which the carriage is returned at high speed to its starting position where it is ready to receive another tube.

The rate of travel through the field magnet of the heat-treatment installation is governed both by the diameter and by the thickness of the tube and by the type of heat-treatment to be applied. The variation in speed required for this purpose is obtained by the direct current electrical control motor.

In addition, terminal effects occur both at the point which the tube enters the field magnet and at the point at which it leaves the field magnet, as a result of which the predetermined rate of travel through the field magnet has to be modified. This modification is preferably carried out automatically by placing the main direct-current advance control under the control of a predetermined program recorded, for example, on a punched card.

According to one aspect of the invention, each of the jacks controlling a retractable arm to which a capcarrying head is connected, is pivoted in relation to the carriage by which it is supported to allow vertical deflections of the heads, so that the natural curve which the tube assumes under the effect of the expansions, relaxation of the residual stresses and unequal skrinkages can be retained by the conveyor rollers, of which the levels have been suitably regulated as indicated earlier on. In other words, the arrangement is such as the caps are unable to introduce additional stresses through their presence.

DESCRIPTION OF DRAWINGS

The invention is described in detail in the following with reference to the accompanying, purely exemplary, drawings, wherein:

FIG. 1 is a diagrammatic plan view of a heattreatment installation comprising a machine according to the invention.

FIG. 3 is a view on a larger scale of a head forming part of a carriage with which the machine according to the invention is equipped.

DESCRIPTION OF PREFERRED EMBODIMENTS

Figure 2:
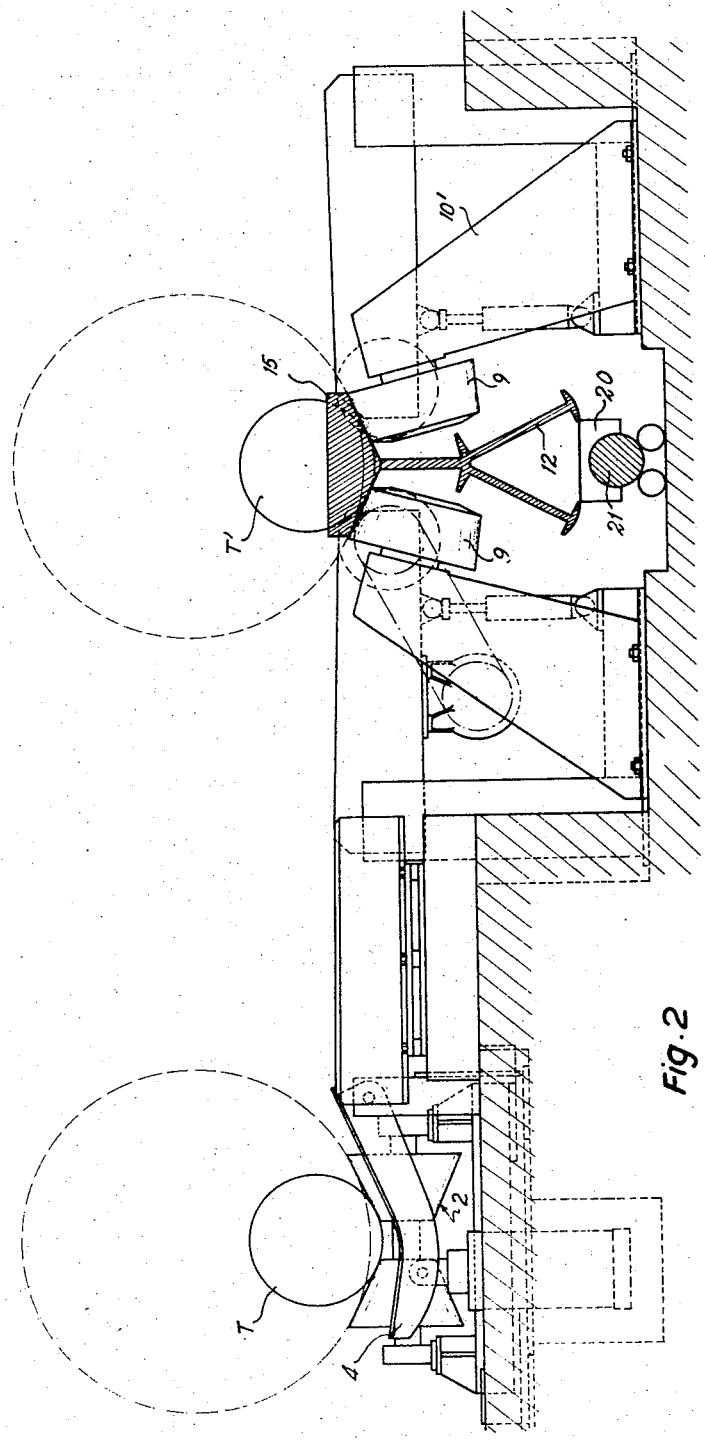
FIG. 2 is a vertical transverse section through the machine shown in FIG. 1.

The installation illustrated diagrammatically in plan in FIG. 1 comprises a delivery line which is denoted generally by the reference 1 and which is intended to feed a tube coming from a selector system (not shown). This delivery line 1 comprises a certain number of pairs of aligned, conical rollers 2, some of which, such as 2a, 2b, 2c, are freely mounted whilst others, such as 2d, 2e, 2f, are driven. The tube T is thus supported and driven longitudinally up to a stop 3. The installation is also equipped with rockers 4 capable of lifting the tube T resting on the rollers 2 and placing it on inclined guides 5 which lead it to an input conveyor 6 parallel to the delivery line 1 (see also FIG. 2).

The input conveyor 6, upstream of the heat-treatment installation 7, like the output conveyor 8 by which it is extended downstream of the installation 7, consists of a number of pairs of idle conical rollers 9 mounted on supporting feet 10'.

A carriage on which the tubes are carried through the heat-treatment installation 7 is designed to be displaced between the rollers of the input and output conveyors. A carriage of this kind comprises two cap-carrying heads 10 and 11 connected together by a beam 12 of considerable length supported and guided through suitable rollers by a roller track formed for example by angle irons joining the supporting feet 10' of the rollers 9. The upstream head 10 and the downstream head 11 are arranged at either end of the heat-treatment installation 7.

Each head comprises a vertically adjustable so-called cap support 13 carried at the end of a long arm 14 which is retractable, being connected for this purpose to a horizontal jack 15 preferably actuated by a nut and thread system. The nut screwed onto the threaded spindle 16 of the jack is rotated by a power reduction unit 17.

Each jack is mounted on a supporting carriage resting and travelling on certain of the idle rollers 9 of the input and output conveyors 6 and 8, but is connected to the beam 12 through a pivot so that the cap-supports 13 are able to undergo vertical deflections.

The cap-supports comprise a vertical base plate 18 carrying for example radial, perpendicular elements 19 similar to the flanges intended to engage inside the tube in order to form a cap capable of just fitting inside the tube at its front and rear ends. It is clear that various forms can be given to these caps whose main function is to keep the ends of the tube round throughout its passage through the heat-treatment installation 7 whilst, at the same time, containing the axial magnetic reactions. To this end, it is advisable to take the measures necessary to avoid closure of the magnetic field, in particular by interrupting the continuity of the base plate 18, or even to avoid heating of the cap, for example by having water circulating inside it.

In addition, the caps prevent water from entering the tube during the quenching operations, and keep air out of the tube throughout the entire heat-treatment.

The carriage formed by the two heads 10 and 11 joined together by the beam 12 is driven by way of the beam which continues after the downstream head 11 and which carries a floating nut 20 screwed onto a threaded spindle 21 which itself is rotated at one of its ends by a control head 22.

The control head 22 is equipped with two electric motors, namely a direct-current motor 26 and an alternating current motor 27. The direct-current motor 26, variable in its speed, advances the carriage carrying the tube between its cap-carrying heads in the direction from the input conveyor 6 to the output conveyor 7, i.e. while the heat-treatment is applied to the tube. The asynchronous electrical motor 27 returns the carriage at high speed by turning the spindle in the opposite direction to bring the carriage back to its starting position where it is ready to receive another tube. Power is transmitted from the motors 26 or 27 to the spindle 21 by trapezoidal belts, chains and epicyclic reduction gears and the installation is of course provided with suitable hydraulic brakes.

The input conveyor 6 is equipped with motor-driven turning mechanisms such as 28a and 28b, each comprising an idle roller 29 and a driving roller 30, these two rollers being vertically adjustable by suitable jacks. These rollers are intended to turn the tube before the cap carrying heads come into contact with it in order to position the weld seam in the vertical plane passing through the axis of the tube, the weld seam thus being aligned with the upper generatrix of the tube.

The output conveyor 8 is equipped with conventional ejecting mechanisms 31 intended to raise the T' following its heat-treatment and to place it on inclined guides 32 which lead it to a removal line 33.

The removal line 33 is substantially identical with the delivery line 1, in other words it comprises a certain number of pairs of aligned, conical rollers 34, some of which, such as 34a, 34b, 34c are idle, whilst others such as 34d, 34e, 34f are self-driving.

The heat-treatment installation 7 comprises a field-magnet support 40 which is formed by a rigid frame and which is intended to receive a heating field magnet.

This assembly is adjustable both vertically and transversely by means of a motorised mechanical control system 41, 42 comprising various coupled screw-type jacks. The field magnet support 40 is also designed to receive the various nozzles forming the quenching skirt.

The conical-roller input conveyor 6 and output conveyor 8 are at a fixed level, in other words they are not vertically adjustable to the diameter of the tubes to be treated. This is because the installation does not have to be regulated in dependence upon this parameter, because it is sufficient to design field-magnet supports and caps variable in their dimensions to correspond to the various tube diameters.

Nevertheless, since the tube assumes a natural curve under the effect of the expansions, relaxation of residual stresses and unequal shrinkages, the cap-supports are pivoted to enable them to undergo vertical deflections to prevent them from introducing any stresses. In order to support the tube during this deformation, it is of advantage individually to regulate the pairs of rollers 9. In order to obtain a slight curve in the input and output conveyors 6 and 8 in relation to the theoretical axis, the bending of the tube is thus compensated in the vertical plane passing through its axis.

Naturally, the beam 12 has a sifficient length and the arms 14 are sufficiently long to ensure integrally the passage of the tube through the installation 7. In addition, the installation 7 can be used both for quenching operations and also for tempering operations.

Thus, a tube T delivered along the delivery line 1 is transferred to the input conveyor 6 between the heads 10 and 11 of the carriage. Under the effect of the turning mechanisms 28a and 28b, the tube is suitably directed to ensure that the weld seam coincides with the upper generatrix.

Under the action of the jacks 15 actuating the arms 14, the caps 18, 19 penetrate inside the ends of the tube. In this way, the tube to be treated is held by one cap at its front end and by another cap at its rear end and is suitably supported by the rollers of the input conveyor 6. By turning the screw threaded spindle 21, the electrical direct-current motor 26 displaces the carriage in such a way that the tube passes through the heat-treatment installation 7 at a controlled speed. Once the tube has passed through the installation 7 and the carriage stopped, the arms 14 are retracted and the ejecting mechanisms 31 transfer the tube to the removal line 33. The asynchronous electrical motor 27 turns the spindle 16 in the opposite direction to return the carriage at high speed to its starting position.

It is obvious that the embodiment which has been described has been given above all by way of example and that it can be modified in numerous ways without departing from the scope of the invention. In particular, one of the heads of the carriage can be designed to accept longidutinal expansion.

What is claimed is:

1. A device for passing tubes through a heat-treatment installation, comprising a heat-treatment installation, an input conveyor upstream of said heat-treatment installation having an assembly of pairs of rollers, an output conveyor downstream of said installation having an assembly of pairs of rollers, a carriage adapted to travel on the rollers of the conveyors and having two heads which are arranged at either end of said treatment installation and a beam which joins the two heads, a cap being provided on each head, mounted on a retractable arm and designed to fit just inside an end of the tube, and positive control means for displacing the carriage on the conveyor rollers in such a way that the caps can be introduced into the two ends of the tube to keep it round throughout the passage of the tube through said treatment installation on the carriage driven by said control means which, in addition, return the carriage to its starting position to receive another tube.

2. A device as claimed in claim 1, characterised in that the pairs of conveyor rollers are individually adjustable to produce a slight curve in the input and output conveyors in relation to the theoretical axis of the tube so as to compensate for the bending of the tube under the combined effect of the internal stresses.

3. A device as claimed in claim 1, characterised in that the input conveyor is equipped with motor-driven turning rollers which turn the tube before the capsupporting heads come into contact with it to position the weld seam in the vertical plane passing through the axis of the tube in the upper position.

4. A device as claimed in claim 1 characterised in that each head of the carriage comprises a jack actuating the retractable arm which carries the cap, this jack being pivotable in relation to the carriage by which it is supported.

5. A device as claimed in claim 1, characterised in that the beam of the carriage carries a nut screwed onto a longitudinal screw-threaded spindle rotated by a control head.

6. A device as claimed in claim 5, characterised in that the head controlling rotation of the threaded spindle onto which the nut carried on the carriage is screwed comprises two electrical motors, namely a variablespeed direct-current motor for turning the spindle in the direction permitting the advance of the carriage guiding the tube through the heat-treatment installation, and an alternating-current motor for returning the carriage at high speed to its starting position where it is ready to receive another tube.

7. A device for passing tubes through a heat-treatment installation comprising a heat-treatment installation, an input conveyor upstream of said heat-treatment installation having an assembly of pairs of rollers individually adjustable to produce a slight curve in the conveyor in relation to the theoretical axis of the tube so as to compensate for the bending of the tube under the combined effect of the internal stresses, and motor-driven turning rollers which turn the tube before the cap-supporting heads come into contact with it to position the weld seam in the vertical plane passing through the axis of the tube in the upper position, an output conveyor downstream of said installation having an assembly of pairs of rollers individually adjustable to produce a slight curve in the conveyor in relation to the theoretical axis of the tube so as to compensate for the bending of the tube under the combined effect of the internal stresses, a carriage adapted to travel on the conveyors, having two heads which are arranged at either end of said treatment installation, and a beam which joins the two heads, each head comprising a cap and a jack which actuates a retractable arm which carries the cap, the jack being pivotable in relation to the carriage.

8. A device as claimed in claim 7, further comprising a longitudinal screw-threaded spindle, and the beam of the carriage carries a nut which is threaded onto the spindle, whereby the carriage is moved axially by rotation of the spindle.

9. A device as claimed in claim 8, further comprising a control head having two electric motors, namely a variable-speed direct-current motor for turning the spindle in the direction permitting the advance of the carriage guiding the tube through the heat-treatment installation, and an A.C. motor for turning the spindle so as to return the carriage at high speed to its starting position where it is ready to receive another tube.

* * * * *